United States Patent [19]

Hatcher

[11] 4,230,054
[45] Oct. 28, 1980

[54] EARTH-WORKING IMPLEMENT

[76] Inventor: John C. Hatcher, 7525 Valleybrook Rd., Charlotte, N.C. 28211

[21] Appl. No.: 934,188

[22] Filed: Aug. 16, 1978

[51] Int. Cl.³ .............................................. A01C 5/04
[52] U.S. Cl. ...................................... 111/62; 111/85; 172/133; 172/271
[58] Field of Search ................... 111/62, 1, 84, 85, 86, 111/87, 88 M, 52; 172/133, 271, 574, 156

[56] References Cited

U.S. PATENT DOCUMENTS

| 456,393 | 7/1891 | Barton | 172/271 |
|---|---|---|---|
| 608,790 | 8/1898 | Otenhouse | 172/574 |
| 2,734,439 | 2/1956 | Padrick | 172/156 |
| 3,170,421 | 2/1965 | Norris et al. | 111/1 |
| 3,306,241 | 2/1967 | Copple | 111/85 X |
| 3,673,970 | 7/1972 | Hatcher | 111/85 |
| 3,705,560 | 12/1972 | Lappin | 172/271 |
| 4,055,126 | 10/1977 | Brown et al. | 111/1 |

Primary Examiner—Edgar S. Burr
Assistant Examiner—James R. Feyrer
Attorney, Agent, or Firm—Bell, Seltzer, Park & Gibson

[57] ABSTRACT

An earth-working implement and a method utilizing such an implement for preparing soil for planting seeds and concurrently planting the seeds wherein a plate-like plow stock penetrates the soil to a substantial depth below ground level, and the soil is concurrently leveled and smoothed inwardly behind the plow stock by concave and forwardly diverging cutting discs straddling the forward path of the plow stock and whose lower extremities are spaced a substantial distance above that of the plow stock for forming a substantially smooth linear area of loose soil. A furrow opener, behind the plow stock, forms a planting furrow in the soil along the linear area, while seeds are being deposited in the furrow and soil is pressed to cover the thus planted seeds. An improved mounting post arrangement is provided for supporting each of the diverging discs in predetermined angular relationship.

2 Claims, 5 Drawing Figures

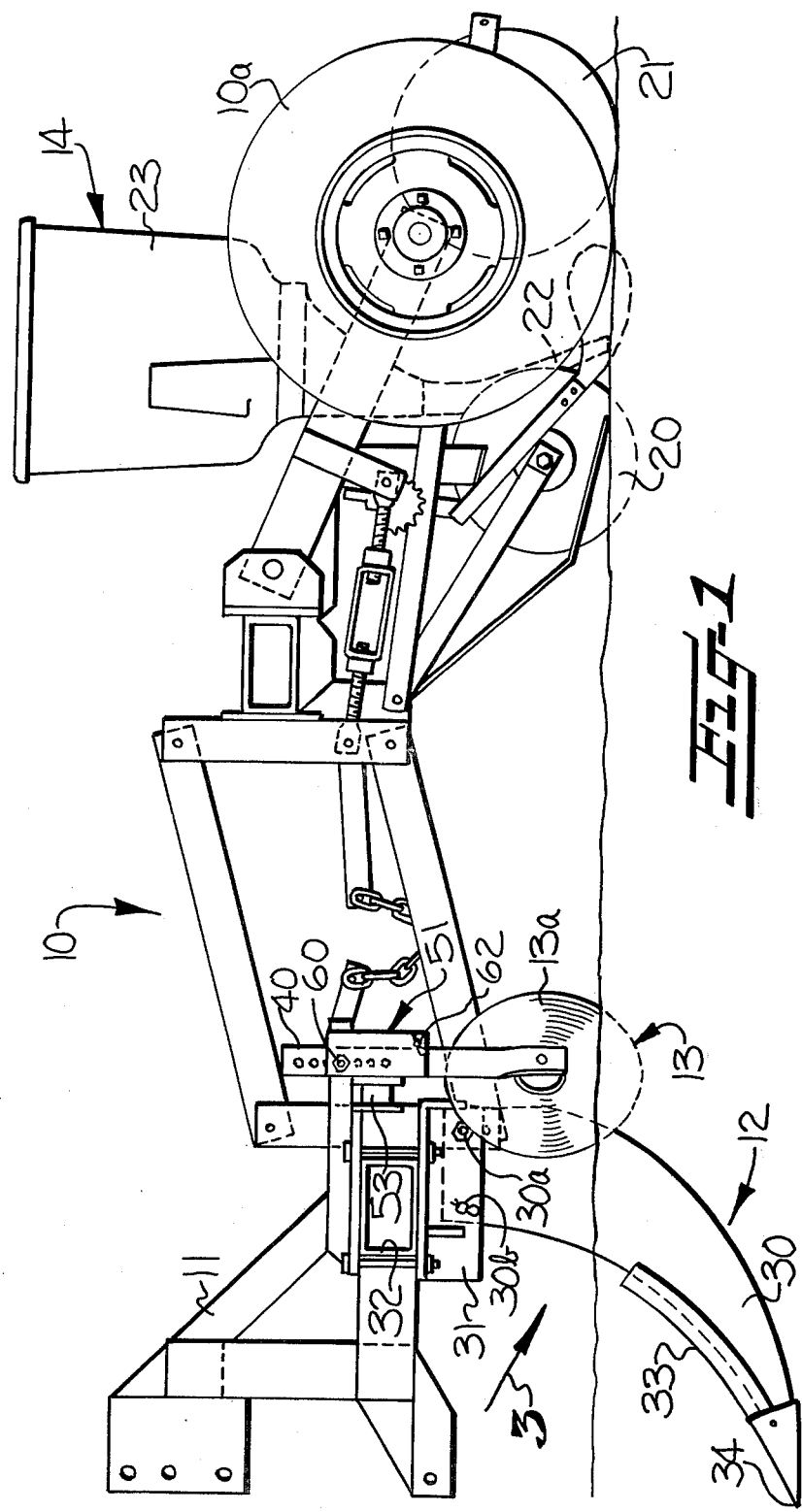

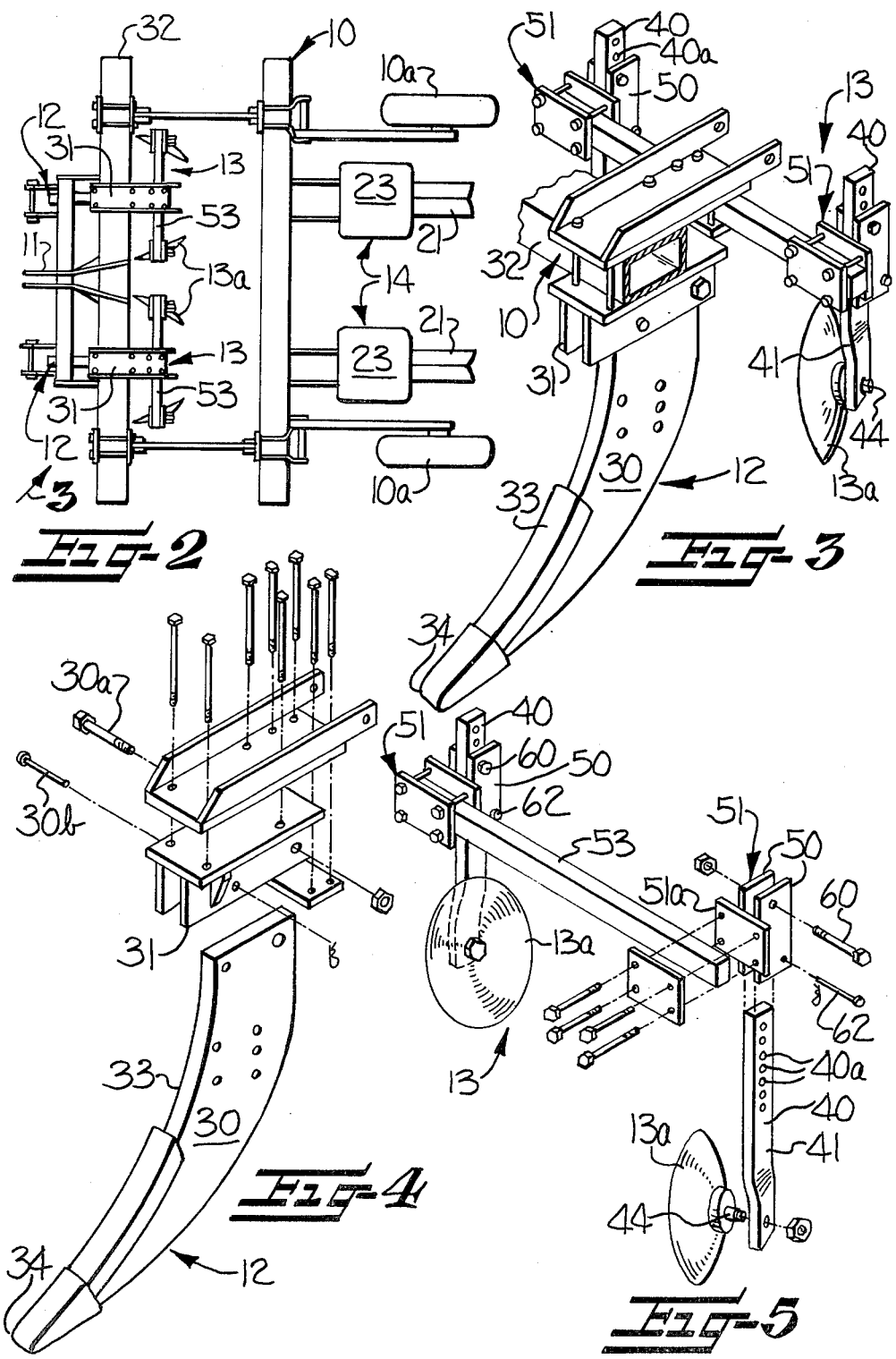

EARTH-WORKING IMPLEMENT

TECHNICAL FIELD OF THE INVENTION

This invention relates to an improved earth-working implement and a method of preparing soil for planting seeds and concurrently planting the seeds.

BACKGROUND OF THE INVENTION

Conventional agricultural practice has been to prepare a field as a seed bed and subsequently plant the prepared field. Such practice requires a number of passes over the field by a succession of implements such as plows, harrows and planters.

Attempts have been made heretofore, as exemplified by Paddock U.S. Pat. No. 2,734,439 among others, to combine the several steps of preparing and planting a field. Other attempts have been directed at improving at least the steps of plowing and harrowing or smoothing a seed bed. The apparatus and methods proposed have suffered deficiencies, particularly in assuring proper smoothing of loosened soil before planting while avoiding damage to the implements used.

BRIEF SUMMARY OF THE INVENTION

Recognizing the deficiencies of previously proposed solutions, it has now been realized that proper preparation of a seed bed can be accomplished while implement damage otherwise possibly occurring is avoided. More particularly, it has been recognized that proper seed bed preparation is facilitated by establishing and maintaining positive positioning of earth-working implements one relative to another. Further, such positive control over positioning can be, as described hereinafter, coordinated with provisions for avoiding damage from obstructions such as rocks, stumps and the like.

It is therefore an object of this invention to provide an earth-working and seed planting implement and method in which a series of earth-working elements are arranged in an improved manner contributing to efficiency in the soil preparation and concurrent seed planting operations.

Another object is to provide an improved disc mounting means for supporting and maintaining in predetermined angular relationship the earth-working cutting discs of the implement with respect to its forward path of travel.

According to one aspect of the invention at least one subsoil plow means in the form of a plate-like stock is carried by frame means adapted to be moved over the ground by a tractor or other suitable propelling means, and the stock has a downwardly and forwardly curved forward cutting edge terminating in a substantially pointed tip at a given level below the frame means. A pair of cutting discs are spaced one from the other rearwardly of and astraddle the forward path of travel of the stock, such discs being inwardly concave and forwardly diverging with their lower extremities spaced a substantial distance above the aforementioned given level of the tip of the stock so as to aid in smoothing the soil upset by the stock. Additionally, seed planter means is carried by the frame means and includes furrow opening means positioned rearwardly of the discs and along the path traversed by the stock so as to form a planting furrow in the soil smoothed by the cutting discs, and seed dispensing means of the planting means is arranged for depositing seeds into the furrow rearwardly of the furrow opening means.

In the preferred embodiment of the invention the improved disc mounting means takes the form of an elongate post means of non-circular cross-sectional configuration for each disc and positioned with a longitudinal axis thereof substantially vertical. The post means is twisted intermediate its ends to form an upper shank portion and a lower disc-mounting portion thereof so that the lower portion, although being in substantially axial alignment with the shank portion, extends at a predetermined radial angle relative to the shank portion, with the respective disc being rotatably supported on a shaft extending radially outwardly from the lower portion of the post means. The shank portion of the post means is received in an opening provided in the frame means, which opening is of such size and shape as to restrain the shank portion from rotation therein and to thereby maintain the respective disc at the desired predetermined angle with respect to the path of travel of the plate-like stock over the ground.

BRIEF DESCRIPTION OF THE DRAWINGS

Some of the objects and advantages of the invention having been stated, others will appear as the description proceeds when taken in connection with the accompanying drawings, in which FIG. 1 is a side elevation illustrating a preferred embodiment of a combination earth-working and seed planting implement according to the invention for carrying out the present method;

FIG. 2 is a top plan view of the implement of FIG. 1 on a reduced scale;

FIG. 3 is an enlarged perspective view looking generally in the direction of the arrows 3 of FIGS. 1 and 2;

FIG. 4 is a partially exploded view of the subsoiler plow stock shown in the left-hand portion of FIG. 3; and FIG. 5 is a partially exploded view of the disc-mounting means in the upper and right-hand portions of FIG. 4.

DETAILED DESCRIPTION

The present invention will be described hereinafter with particular reference to the accompanying drawings which show a preferred embodiment of the present invention. It is to be understood at the outset, however, that the drawings and description are for illustrative purposes only and are to be construed broadly, since it is contemplated that variations in detail may be made in practicing the present invention.

Referring more specifically to the drawings, the earth-working and planting implement of FIGS. 1 and 2 comprises frame means generally designated at 10 and which is adapted to be moved over the ground by a tractor or other suitable propelling means, not shown. The front end of frame means 10 includes a hitch structure 11 which may be connected to the tractor by a conventional lifting apparatus such as that shown in U.S. Pat. No. 3,673,970, for example. The rear portion of frame means 10 may be supported on ground wheels 12, as is conventional.

As illustrated, the frame means 10 carries two series of earth-working components, each including a subsoiler 12, a soil smoothing unit 13, and a seed planter 14. Although the implement is shown in FIG. 2 as being provided with two series of earth-working components, the following description will proceed particularly with reference to those elements which are used in planting a single row, it being understood that these elements are duplicated as required to plant multi-rows.

The planter 14 may be constructed and arranged substantially in accordance with the disclosure of U.S. Pat. No. 3,598,069. Inasmuch as a fully detailed disclosure of the general structure and arrangement of the planter 14 is available in that prior patent, such disclosure will not be repeated at length here. The basic elements of the planter 14 include planting furrow opening means 20 (shown as being of the double-disc type in FIG. 1), a press wheel means 21, and a seed dispensing means 22 for dispensing seeds from a conventional seed hopper 23 thereabove. These elements cooperate with one another to open a seed receiving furrow in the ground traversed by the planter 14, deposit seed into the open furrow, and press the furrow closed while tamping the ground above the buried seed.

In accordance with an important feature of this invention, the subsoiler or subsoil plow means 12 comprises a plate-like plow stock 30 having its upper portion suitably fixedly secured to a bracket means 31 mounted on a main, forward, transverse frame member 32 of the frame means 10. The plate-like plow stock 30 is provided with a downwardly and forwardly curved forward cutting edge 33 terminating in a substantially pointed tip at a given level a substantial distance below ground level for breaking the soil and forming an elongate line of relatively loose soil while the stock is being moved forwardly in a substantially straight path.

The soil smoothing unit 13 comprises a pair of inwardly concave and forwardly diverging cutting discs 13a positioned to straddle the forward path of travel of the plow stock 30 during earth-working by the implement, with each disc being located rearwardly of the plow stock 30, and with the lower extremities of the discs 13a being spaced a substantial distance above the aforementioned given level of the tip 34 of the stock 30 so as to aid in leveling and smoothing the soil upset by the plow stock 30. It is to be noted that the furrow opening means 20 of the seed planter 14 is positioned so as to form a planting furrow in the soil along the elongate substantially level and substantially smooth linear area of aerated loose soil formed by the cooperation between the plate-like plow stock 30 and the forwardly diverging cutting discs 13a, with the planting furrow being formed to a depth below ground level which is substantially less than the depth of penetration of the soil by the stock. Additionally, the furrow opening means 20 is located a sufficient distance behind the plow stock 30 to accommodate the leveling and smoothing of the soil in a zone between the plow stock 30 and the furrow opener 20.

In accordance with another important feature of this invention, improved means is provided for rotatably supporting each cutting disc 13a to maintain the same in a predetermined position during operation of the implement. Such means includes an elongate mounting post means 40 for each disc 13a, with a longitudinal axis of such post means 40 being substantially vertical. Each mounting post means 40 may be of a rectangular or other non-circular cross-sectional configuration and is best shown in FIGS. 1, 3 and 5 in the form of an elongate rectangular bar.

In order to maintain the respective cutting discs 13a in the desired angular position with respect to the forward path of travel of the implement, each mounting post means 40 is twisted intermediate its ends, as at 41, to form an upper shank portion and a lower disc-mounting portion of the mounting post means with the lower portion extending in substantially axial alignment with the shank portion but being at a predetermined radial angle relative to the shank portion by virtue of the twist 41 in the mounting post means 40. A shaft means 44 is suitably mounted in the lower portion of each respective elongate mounting post means 40 and extends outwardly therefrom for rotatably supporting the respective disc 13a thereon.

The frame means 10 is provided with means having an opening therein for receiving the shank portion of each respective elongate mounting post means 40 therein, with the opening being so shaped and of such size as to restrain the shank portion from rotation therein and to thereby maintain the respective disc at the desired predetermined angle with respect to the path of travel of the plow stock 30 of the subsoiler 12 over the ground. To this end, the opening for receiving the shank portion of each respective mounting post means 40 may take the form of a pair of laterally spaced substantially vertically disposed frame members or plates 50 preferably having substantially flat proximal surfaces thereon for receiving thereagainst opposing substantially flat surfaces of the upper or shank portion of the respective mounting post means 40. The frame members 50 for each post means 40 are shown in FIG. 5 as being parts of bracket means 51 adapted to be secured to a relatively small transverse frame member 53 of frame means 10 and being positioned closely adjacent and rearwardly of the forward main frame member 32.

Cooperating with each of the bracket means 51 are means normally restraining the post means from movement relative to the frame means, but permitting the post means and its respective disc 13a to be pivoted upwardly and rearwardly relative to the frame means 10 in the event of the forwardly moving disc 13a being subjected to a predetermined force obstructing forward movement thereof with the frame means, such as by the disc engaging a heavy stone or other relatively immovable obstruction so the disc may override the obstruction. Accordingly, a pivot means or bolt 60 pivotally connects a portion of each respective shank portion to the respective bracket means 51 of the frame means 10, for movement of the respective post means 40 about a substantially horizontal axis extending generally transversely of the forward path of travel of the implement. To facilitate vertical adjustment of each mounting post means 40 for obtaining the desired depth of penetration of the soil by the corresponding disc 13a, the shank portion of each mounting post means 40 may be provided with a vertical row of substantially horizontally extending holes 40a therethrough, with the corresponding bolt 60 penetrating any one of the desired holes 40a.

As shown, each bolt 60 extends through an upper portion of the corresponding bracket means 51. Therefore, in order to normally restrain each post means 40 from movement about its axis defined by the corresponding bolt means 60, the front surface of a portion of the shank portion of each post means 40 is normally held against a front wall means 51a of the corresponding bracket means 51 by a shear pin means 62 (FIG. 3) extending through a lower portion of the frame members or plates 50 and normally engaging the front surface of the shank portion of the corresponding mounting post means 40. Thus, it is apparent that each shear pin means 62 normally restrains the respective post means from movement about its substantially horizontal axis. However, each shear pin means may be of such diameter relative to the bolt 60, or may be made from a more frangible material than the bolt 60, so that it is adapted to shear upon the corresponding post means being subjected to a predetermined force obstructing forward movement of the respective disc 13a with the frame means 10, such as by the disc engaging a heavy stone or other obstruction, so that the disc and its post means may be pivoted upwardly and rearwardly about the corresponding bolt 60 relative to the frame means 10 by such obstruction and thereby override the obstruction.

If desired the plow stock 30 may be supported in a manner similar to each mounting post means 40 so as to also be pivoted upwardly and rearwardly to override a heavy obstruction in its path. Accordingly, it will be observed in FIGS. 3 and 4 that the upper portion of the plow stock 30 fits between opposing wall plates of the bifurcated lower portion of bracket means 31, and the plow stock 30 is secured to the latter opposing wall plates by a pivot bolt 30a positioned rearwardly of a shear pin means 30b. It is thus apparent that the bolt 30a and shear pin means 30b may serve a similar function with respect to the plow stock 30 as that of the bolt 60 and shear pin means 62 with respect to each respective mounting post means 40.

It is thus seen that I have provided an improved implement and method of preparing soil for planting seeds and concurrently planting the seeds in which the soil is broken and formed into an elongate line of relatively loose soil by penetrating the soil with the plate-like plow stock 30 of the subsoiler 12 to a substantial distance below the ground level while moving the plow stock forwardly in a substantially straight path, concurrently with which the soil is leveled and smoothed inwardly closely behind the forwardly moving stock 30 by the pair of inwardly concave and forwardly diverging cutting discs 13a, with the lower extremities of the cutting discs being spaced a substantial distance above the level of the lower extremity of the plate-like plow stock 30 and which discs are located rearwardly of the stock so as to form an elongate substantially level and substantially smooth linear area of aerated loose soil. Also it can be appreciated that the furrow opener 20 (FIG. 1) of the planter 14 forms a planting furrow in the soil along the elongate linear area affected by the discs 13a, but with the furrow opener forming the furrow to a depth below ground level which is substantially less than the depth of the penetration of the soil by the plow stock 30, and wherein the furrow opener 20 moves along with but a sufficient distance behind the plow stock 30 to accommodate the leveling and smoothing of the soil in a zone between the stock and the furrow opener. Also, while the furrow opener 20 is forming the planting furrow, the seed dispenser means 22 deposits seeds in the furrow being formed by the furrow opener and soil is pressed in the furrow to cover the planted seeds by means of the press wheel means 21.

It also can be seen that I have provided improved elongate mounting post means 40 for rotatably supporting each cutting disc 13a on the lower portion thereof in such a manner as to maintain each cutting disc 13a in a predetermined position during operation of the implement and relative to the path of travel of the implement, along with means for normally restraining the post means from movement about a horizontal axis but being adapted to shear upon the post means being subjected to a predetermined force obstructing forward movement of the respective disc with the frame means, such as by the disc engaging a heavy stone or other obstruction.

In the drawings and specification there has been set forth a preferred embodiment of the invention and although specific terms are employed, they are used in a generic and descriptive sense only and not for purposes of limitation.

That which is claimed is:

1. A combination earth-working and seed planting implement comprising:
    frame means adapted to be moved over the ground by a propelling means, such as a tractor,
    at least one subsoil plow means including a plate-like stock carried by said frame means and provided with a downwardly and forwardly curved forward cutting edge terminating in a substantially pointed tip at a given level below said frame means,
    a pair of cutting discs spaced one from the other and positioned to straddle the forward path of travel of said stock during earth-working by the implement, said discs being inwardly concave and forwardly diverging relative to each other and with respect to said path of travel and each disc being located rearwardly of said stock with the lower extremities of said discs being spaced above said given level of said tip so as to aid in leveling and smoothing the soil upset by said stock,
    means rotatably supporting each cutting disc to maintain the same in a predetermined position during operation of the implement and including
        elongate mounting post means positioned with a longitudinal axis thereof substantially vertical and having a non-circular cross-sectional configuration,
        said mounting post means being twisted intermediae its ends to form an upper shank portion and a lower disc-mountig portion thereof with said lower portion extending in substantially axial alignment with said shank portion and at a predetermined radial angle relative to said shank portion by virtue of the twist in said post means,
        shaft means extending radially outwardly from said lower portion of said post means and rotatably supporting the respective disc thereon, and
        means on said frame means having an opening therein for receiving said shank portion of said post means therein and wherein said opening is shaped and sized to restrain said shank portion from rotation therein and to thereby maintain the respective disc at the desired predetermined angle with respect to the path of travel of said stock over the ground, and
    seed planter means carried by said frame means and including furrow opening means spaced rearwardly of said discs and being positioned along the path of travel of said stock so as to form a planting furrow in the soil leveled and smoothed by said discs, and seed dispensing means for depositing seeds into the furrow rearwardly of said discs.

2. An earth-working and seed planting implement according to claim 1 wherein said means for receiving said shank portion of said mounting post means therein comprises
    pivot means pivotally connecting a portion of said shank portion to said frame means for movement of said post means about a substantially horizontal axis extending generally transversely of said forward path of travel of said stock, and shear pin means carried by said frame means and being arranged to normally restrain said post means from movement about said horizontal axis but being adapted to shear upon said post means being subjected to a predetermined force obstructing forward movement of the respective disc with said frame means, whereby said disc and its post means may be pivoted upwardly and rearwardly relative to said frame means by any obstruction encountered so as to override the obstruction.

* * * * *